(12) United States Patent
Graham

(10) Patent No.: US 11,429,463 B2
(45) Date of Patent: Aug. 30, 2022

(54) FUNCTIONAL TUNING FOR CLOUD BASED APPLICATIONS AND CONNECTED CLIENTS

(71) Applicant: Hewlett-Packard Development Company, L.P., Spring, TX (US)

(72) Inventor: Christoph J. Graham, Spring, TX (US)

(73) Assignee: Hewlett-Packard Development Company, L.P., Spring, TX (US)

(*) Notice: Subject to any disclaimer, the term of this patent is extended or adjusted under 35 U.S.C. 154(b) by 0 days.

(21) Appl. No.: 15/734,685

(22) PCT Filed: Mar. 15, 2019

(86) PCT No.: PCT/US2019/022463
§ 371 (c)(1),
(2) Date: Dec. 3, 2020

(87) PCT Pub. No.: WO2020/190256
PCT Pub. Date: Sep. 24, 2020

(65) Prior Publication Data
US 2021/0397494 A1    Dec. 23, 2021

(51) Int. Cl.
*G06F 9/54* (2006.01)
*G06F 9/50* (2006.01)

(52) U.S. Cl.
CPC ............ *G06F 9/547* (2013.01); *G06F 9/5005* (2013.01)

(58) Field of Classification Search
None
See application file for complete search history.

(56) References Cited

U.S. PATENT DOCUMENTS

| | | | |
|---|---|---|---|
| 10,057,182 B2 | 8/2018 | Hate | |
| 2008/0080534 A1* | 4/2008 | Lee | H04L 12/2832 370/401 |
| 2014/0336786 A1 | 11/2014 | Asenjo et al. | |
| 2015/0277399 A1 | 10/2015 | Maturanan et al. | |
| 2015/0347119 A1 | 12/2015 | Wang et al. | |
| 2016/0099887 A1 | 4/2016 | Dunbar et al. | |
| 2017/0078410 A1 | 3/2017 | Rao | |
| 2017/0093702 A1 | 3/2017 | Teng et al. | |
| 2017/0199770 A1 | 7/2017 | Peteva et al. | |

(Continued)

Primary Examiner — Charles E Anya
(74) Attorney, Agent, or Firm — Fabian VanCott

(57) ABSTRACT

A cloud computing system including a cloud-based system in communication with a client system including an application gateway that receives from a client application, a request for services associated with a workload and a plurality of cloud-based application services, the plurality of cloud-based application services in operable communication with the application gateway. The system also includes a cloud-based tuning service in operable communication with the cloud-based application services and the application gateway, the cloud-based tuning service identifies a set of application requirements needed to fulfill the request, the cloud-based tuning service coordinating with a client-based tuning service and the application gateway to assign selected application services to fulfill the request, wherein the assignment of selected application services includes assigning at least a portion of the services associated with the workload the client system.

20 Claims, 5 Drawing Sheets

(56) References Cited

U.S. PATENT DOCUMENTS

2017/0331907 A1 11/2017 Jagannath
2018/0300176 A1* 10/2018 Chen ..................... G06F 9/4887
2019/0089746 A1* 3/2019 Beckman ................ H04L 63/10

* cited by examiner

FUNCTIONAL TUNING FOR CLOUD BASED APPLICATIONS AND CONNECTED CLIENTS

BACKGROUND

Cloud computing is a widely adopted and yet evolving concept. Generally, cloud computing refers to a model for enabling ubiquitous, convenient, and on-demand access via Internet to shared pools of configurable computing resources such as networks, servers, storage, applications, functionalities, and the like. There are a number of benefits associated with cloud computing for both the providers of the computing resources and their customers. For example, customers may develop and deploy various business applications on a cloud infrastructure supplied by a cloud provider without the cost and complexity to procure and manage the hardware and software applicable to execute the applications. The customers do not need to manage or control the underlying cloud infrastructure, e.g., including network, servers, operating systems, storage, etc., but still have control over the deployed applications. On the other hand, the provider's computing resources are available to provide multiple customers with different physical and virtual resources dynamically assigned and reassigned according to clients' load. Further, cloud resources and applications are readily accessible via the Internet.

As more computing and software services move to cloud-based services and adopt an "as-a-Service" model, new systems become desirable to ensure application liveliness, performance, and scale as workloads and resources change. While workloads generally increase and decrease, cloud-based resources are allocated/unallocated as needed to address the current workload. However, it should be noted that in some instances, some portions of cloud-based processing may not be efficient when executed in a cloud-based device. Moreover, in some instances, client devices may experience poor or reduced connectivity or experience dropouts or no connectivity to the underlying services associated with an application. However, it may also be desirable to preserve a device independent, cloud-based, operating model for software architectures. Accordingly, there exists a desire to provide a method and system for cloud-based applications to shift resources (including operational code) from the standard paradigm of a cloud hosted data center to also include the endpoint client device in order to create new experiences or consistent performance for experiences regardless of connectivity issues.

BRIEF DESCRIPTION OF THE DRAWINGS

The foregoing and other features, and advantages of the present disclosure are apparent from the following detailed description taken in conjunction with the accompanying drawings in which.

DETAILED DESCRIPTION

Figure 1:
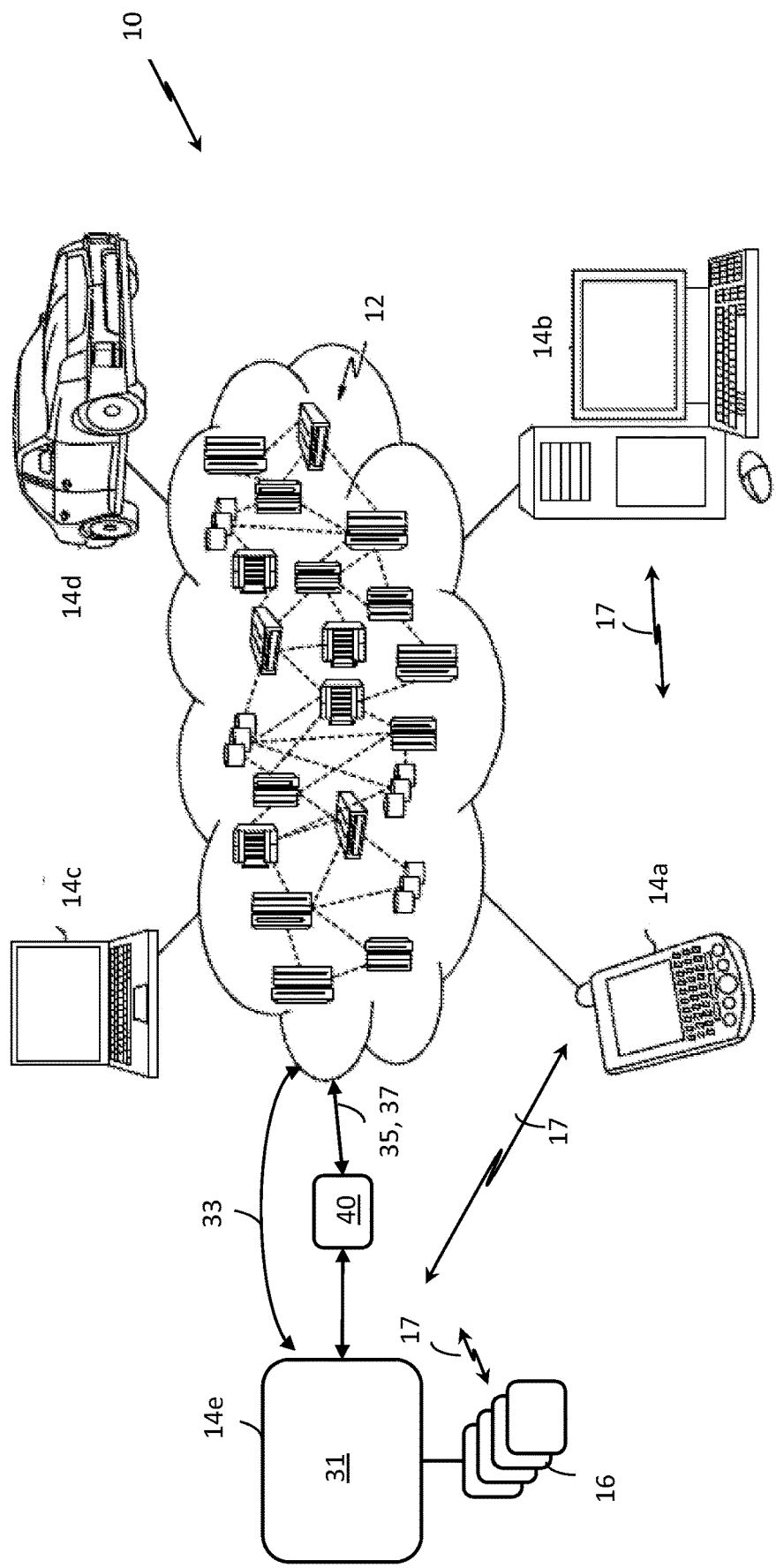
FIG. 1 depicts a cloud computing environment according to examples described herein.

According to several described examples, implementing a cloud computing mixed mode cloud/on-premises solution can provide advantages such as more cost-effective workload allocation to available resources, as well as secure communication as typically employed with cloud-based communications. It should be appreciated that while the examples are described herein with reference to a cloud-based resource allocation solution, these descriptions are for illustration and should not be considered limiting. The described examples relate to a container architected cloud computing application.

A component of the architecture acts as a gateway for various services within the cloud application; routing requests to the correct IP address and service offerings. Containers are employed to decouple locations by allowing a client service and cloud service to synchronize and deploy cloud-hosted containers of business logic or application services directly to an endpoint device or an intermediary device known to both the client and the server.

A tuning service is employed to manage and maintain the deployment and is maintained on a one-to-one basis per client endpoint application. Finally, within the client application space, network requests are first checked against a local gateway proxy to determine if the service is available within the tunable cache of services, or if the request should be sent to the cloud provider gateway. This approach requires no discernable changes to the client architecture at all, facilitating backward compatibility. Uniquely, the client and/or a user is unaware of migration of resources and services between the client endpoint and the cloud service. In another example, a similar tuner may be used to redirect services across cloud provider domains or to device endpoints that are mid-stream from the endpoint and the cloud service.

In addition to the features described herein, further examples of the system may include that the assignment includes allocating select application services of the plurality of cloud-based application services to the client-based tuning service and the client system. Further, the assignment may be based on information in the request.

In addition to the features described herein, further examples of the system may include that the information includes at least one of an application profile, metadata of the client system, metadata regarding the client application, capabilities of at least one of the client-based tuning service and the client system, capabilities of at least one of the client-based tuning service and the client system, connectivity between the client system and the cloud-based server system, a connection selection by a user.

In addition to the features described herein, further examples of the system may include that the assignment is based on quality of service associated with at least one cloud-based application service of the plurality of cloud-based application services. Moreover, the assignment is based on connectivity of the client system to the cloud-based server system. Further examples of the system may include that the client application is independent of the assignment.

In addition to the features described herein, further examples of the system may include that at least one of; the cloud-based tuning service coordinates with the client-based tuning service and the application gateway to un-assign the selected application services of the plurality of cloud-based application services, and the cloud-based tuning service coordinates with the client-based tuning service and the application gateway to modify the assignment of the selected application services of the plurality of cloud-based application services wherein the assignment of selected application services includes assigning at least another portion of the services associated with the workload the client system.

Also described herein is a system for tuning a cloud computing system connected to a client system. The system includes a client system in operable communication with a cloud-based server system, the client system including a computer processor and a memory containing a program, which when executed by the processor, performs an operation including transmitting, a request for application services to be allocated to a workload to a cloud computing environment, identifying, by a tuning service a set of requirements to fulfill the request, determining, by the tuning service, a set of application services suitable to satisfy the set of requirements, and providing, by the tuning service, the set of application services suitable to fulfill the request, wherein the providing includes assigning at least a portion of the set of application services to the client system.

Also described herein in yet another example is a method of tuning cloud applications of a cloud-based server system in operable communication with a client system. The method comprising transmitting a request for resources to be allocated to a workload for a client application associated with the client system to an application gateway of the cloud-based server system, assigning, by a cloud-based tuning service to a client-based tuning service, a portion of a set of application services sufficient to satisfy the request to the client system, and allocating, by the cloud-based tuning service, any remaining application services of the set of application services sufficient to satisfy the request to the cloud-based server system. Moreover, further examples of the method may include that the assigning is based on information in the request.

In addition to the features described herein, further examples of the method may include that the information includes at least one of an application profile, metadata of the client system, metadata of the client application, capabilities of at least one of the client-based tuning service and client system, capabilities of at least one of the client-based tuning service and client system, connectivity between the client system and the cloud-based server system, a connection selection by a user.

In addition to the features described herein, further examples of the method may include that the assigning is based on at least one of a quality of service associated with at least one application service of the set of application services and a connectivity of the client system to the cloud-based server system. Further examples of the method may also include that the client application is independent of the assigning.

In addition to the features described herein, further examples of the method may include at least one of, un-assigning at least part of the portion of the set of application services assigned to the client system, and modifying the assignment of the portion of the set of application services assigned to the client system.

Continuing with implementations of cloud computing environments, an enterprise may select either to run an application fully on-premises e.g., client-based or fully on a cloud-based platform, e.g., cloud-based. However, there are advantages and disadvantages with both cloud and client-based on-premises platforms. Issues related to security and compliance of cloud platforms may be one disadvantage. On the other hand, for on-premises platforms the cost, particularly initial cost may be a disadvantage. Since the initial investment in on-premises client infrastructure may be high, an enterprise that has already invested in on-premises platforms may prefer gradual adoption of cloud platforms, if at all, in order to maximize return and protect their initial investments. Conversely, an enterprise may otherwise desire a suite of applications that is cloud-based for its flexibility and lower implementation cost, yet desire the functionality and security of an on-premises application. Therefore, a hybrid software delivery model may bring more value to such enterprises. An application to be deployed and run on both on-premises and cloud platforms, with little or no modification of the original source code of the application, is referred herein as a hybrid application.

One form of hybrid delivery model is a mixed model between on-premises based applications and cloud-based applications, e.g., on-demand. For example, in the case where an application operates on an on-premises platform with sensitive data, such data may be undesirable to be stored on a cloud platform and accessed via the Internet. In such a case, a hybrid software delivery may be used where certain cloud-based services can be consumed by applications operating on an on-premises platform. For example, in one instance, a hybrid application may be deployed and/or run on an on-premises platform, and consume services or other resources provided by a cloud platform (e.g., public or virtual private cloud) as needed for select tasks. Further, a hybrid application may be deployed and/or run on a cloud platform and consume resources of an on-premises platform such as a backend system. Yet another situation, where a hybrid software delivery model may be appropriate is when an enterprise prefers to run their existing on-premises applications on a cloud platform. For example, business applications running and operating on-premises at one point may be extended or migrated towards a cloud platform, for example, to consume functionality and modern development environment and models provided by the cloud platform. However, to enable an application operating on-premises to operate on cloud, the enterprise may have to incur costs comparable to develop a new application resulting in worse protection for on-premises investments. Also, when an application is migrated to the cloud platform, two versions of the application may have to be maintained for the on-premises and the cloud platform, increasing maintenance costs for the application.

Enterprises applying either on-premises or cloud software delivery model usually may have to balance between security and costs. Recently, to provide the greatest flexibility, yet balance cost, with the expansion of cloud-based services, the desire has been to consume cloud-based services. However, to improve the operation of the cloud-based services, a hybrid software delivery model may be used where certain cloud-based services direct some operations to an on-premises platform. In this instance of the described examples, a tuning service monitors the workload requirements of the cloud-based services and in selected instances directs some portion of tasks to the client on-premises platform.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. An application service is composable set of functions provided by the cloud application. Application services are commonly isolated into containers that can be dynamically started, stopped and monitored within the cloud hosting provider's infrastructure. A cloud-based resource is a set of resources (data, images, files, metadata, processes and the like) that the cloud application (through an Application Service) relies upon to function. Similarly, a client application is typically a local application employing local services and resources (e.g., a set of resources (data, images, files, metadata, processes, and the like) operably connected to a local i.e., on-premises computing device. In addition, a client application may include a browser-based application utilizing a set of cloud resources through the application gateway but can be any network connected application that relies on such a cloud gateway to provide access to functionality. For example, Alexa or Google Home could be considered such applications that do not use a browser. Moreover, a local resource can also be a resource that a cloud application (via a relocated service as described herein) employs to carry out a specified function.

A cloud computing model may include numerous operational characteristics, with several service models, as well as a variety of unique deployment models. For example, some specific operational characteristics include, but are not limited to: on-demand self-service, where a cloud consumer can unilaterally provision computing capabilities, such as server time and network storage, as needed automatically without requiring human interaction with the service's provider, and broad network access, capabilities are available over a network and accessed through standard mechanisms that promote use by heterogeneous thin or thick client platforms (e.g., mobile phones, laptops, and PDAs). Other characteristics of cloud-based computing include, resource pooling, where the provider's computing resources are pooled to serve multiple consumers using a multi-tenant model, with different physical and virtual resources dynamically assigned, un-assigned, and reassigned according to demands of workloads. It should be noted that there is a sense of location independence in that the consumer/user generally has no control or knowledge over the exact location of the provided resources but may be able to specify location at a higher level of abstraction (e.g., country, state, or datacenter). Additional characteristics of cloud computing included rapid elasticity, that is, an architecture where capabilities can be rapidly and elastically provisioned, in some cases automatically, to quickly scale out and rapidly released to quickly scale in. As a result, to the consumer, the capabilities available for provisioning often appear to be unlimited and can be purchased in any quantity at any time. Likewise, another characteristic is that of a measured service, cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service models include Software as a Service (SaaS) where the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings. Another service model is Platform as a Service (PaaS) where the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. Yet another service model is Infrastructure as a Service (IaaS) where the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment models for cloud services include, private cloud services, community cloud services, public cloud services, and hybrid cloud services. In private cloud services, the cloud infrastructure is operated solely for an organization. It may be managed by the organization or a third party and may exist on-premises or off-premises. With community cloud services the cloud infrastructure is shared by several organizations and supports a specific community that has shared concerns (e.g., mission, security requirements, policy, and compliance considerations). It may be managed by the organizations or a third party and may exist on-premises or off-premises. With public cloud, the cloud infrastructure is made available to the general public or a large industry group and is owned by an organization selling cloud services. Finally, with hybrid cloud structure, the cloud infrastructure is a composition of two or more clouds (private, community, or public) that remain unique entities but are bound together by standardized or proprietary technology that enables data and application portability. As described herein, hybrid configurations may also include an infrastructure where a portion of a workload or service is allocated to a cloud computing environment while another portion may be allocated elsewhere such a to a client or on-premises system.

A cloud computing environment is service oriented with a focus on statelessness, low coupling, modularity, and semantic interoperability. At the heart of cloud computing is an infrastructure comprising a network of interconnected nodes.

Referring now to FIG. 1, an illustrative cloud computing environment 10 is depicted. As shown, cloud computing environment 10 comprises at least one cloud computing node 12 with which on-premise computing devices or clients 14a-e may communicate. The cloud computing nodes 12 may include various communication gateways, application services and resources as needed for implementing the cloud computing environment 10. The on-premise computing devices/clients 14a-e are generally connected to an on-premises local area network (LAN) 17, wide area network (WAN) or cellular, and the like to facilitate communication with a the cloud computing nodes 12. For example, the on-premises computing devices/clients 14 could be, a personal digital assistant (PDA) or cellular telephone depicted as 14a, desktop computer/terminal/server shown as 14b, laptop computer shown as 14c, even a vehicle depicted as 14d, or control panel or system for a building system and the like depicted as 14e. Computing devices or clients 14a-e may also be to communicate with each other or a variety of sensors 16. The communication with other computing devices or clients 14a-e or sensors 16 could be wired or wireless as needed. The communication could also be via a Local Area Network (LAN) if desired as depicted by arrows 17. Cloud computing nodes (also referred to as resources) 12 may communicate with one another and/or be grouped (not shown) physically or virtually, in networks, such as Private, Community, Public, or Hybrid clouds as described herein, or in various combinations thereof. This allows cloud computing environment 10 to offer infrastructure, platforms and/or software as services for which a cloud consumer does not need to maintain or minimize resources at a local computing device level. In one example the cloud computing environment includes a tuning program 40 that communicates between a cloud device such as a node 12 and a client application 31 such as may be employed on a client system e.g., a computing device 14. The application service and tuning program may communicate with the cloud system and the nodes thereof via lines 33, 35, and 37 as depicted and described in further detail herein. It is understood that the types of computing devices 14 shown in FIG. 1 are intended to be illustrative and that cloud computing nodes 12 and cloud computing environment 10 can communicate with any type of computerized device over any type of network and/or network addressable connection (e.g., using a web browser).

Figure 2:
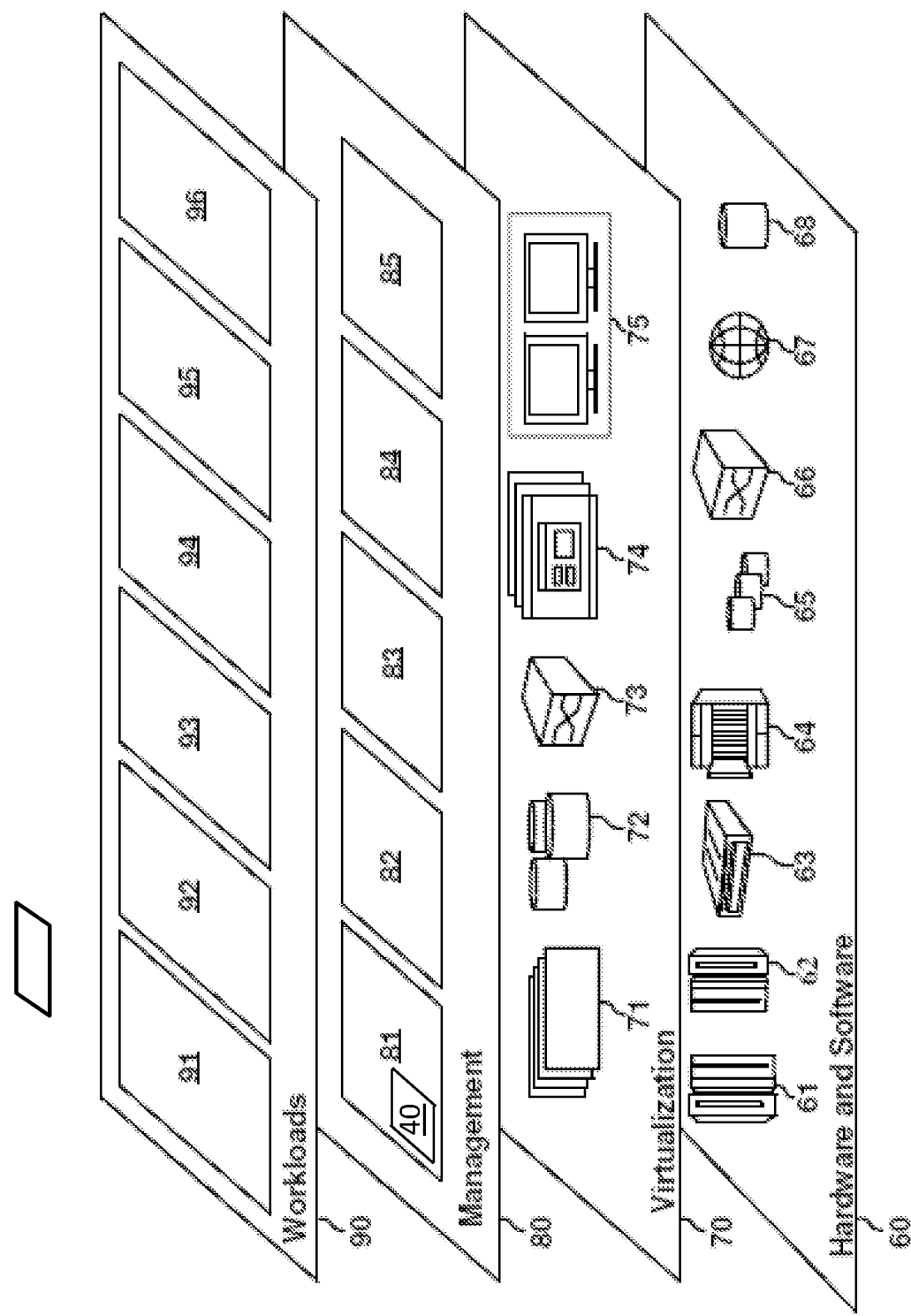
FIG. 2 depicts abstraction model layers according to examples described herein.

Referring now to FIG. 2, a set of functional abstraction layers provided by cloud computing environment 10 (FIG. 1) is shown. It should be understood in advance that the components, layers, and functions shown in FIG. 2 are intended to be illustrative and examples and are not limited thereto. As depicted, the following layers and corresponding functions are provided.

Hardware and software layer 60 include hardware and software components. Examples of hardware components include: mainframes 61; RISC (Reduced Instruction Set Computer) architecture-based servers 62; servers 63; blade servers 64; storage devices 65; and networks and networking components 66. In some examples, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment 10. Metering and Pricing 82 provide cost tracking as resources are utilized within the cloud computing environment 10, and billing or invoicing for consumption of these resources. In one example, these resources may comprise application software licenses. Security provides identity verification for cloud consumers and tasks, as well as protection for data and other resources. User portal 83 provides access to the cloud computing environment 10 for consumers and system administrators. Service level management 84 provides cloud computing resource allocation and management such that applicable service levels are met. Service Level Agreement (SLA) planning and fulfillment 85 provides pre-arrangement for, and procurement of, cloud computing resources for which a future requirement is anticipated in accordance with an SLA. The tuning program 40 interfaces with the resource provisioning 81 to implement the features of tuning and application allocation as described further herein Workloads layer 90 provides examples of functionality for which the cloud computing environment 10 may be utilized. Examples of workloads and functions which may be provided from this layer include: mapping and navigation 91; software development and lifecycle management 92; virtual classroom education delivery 93; data analytics processing 94; transaction processing 95; and processing of messages across multiple communication systems 96.

Figure 3:
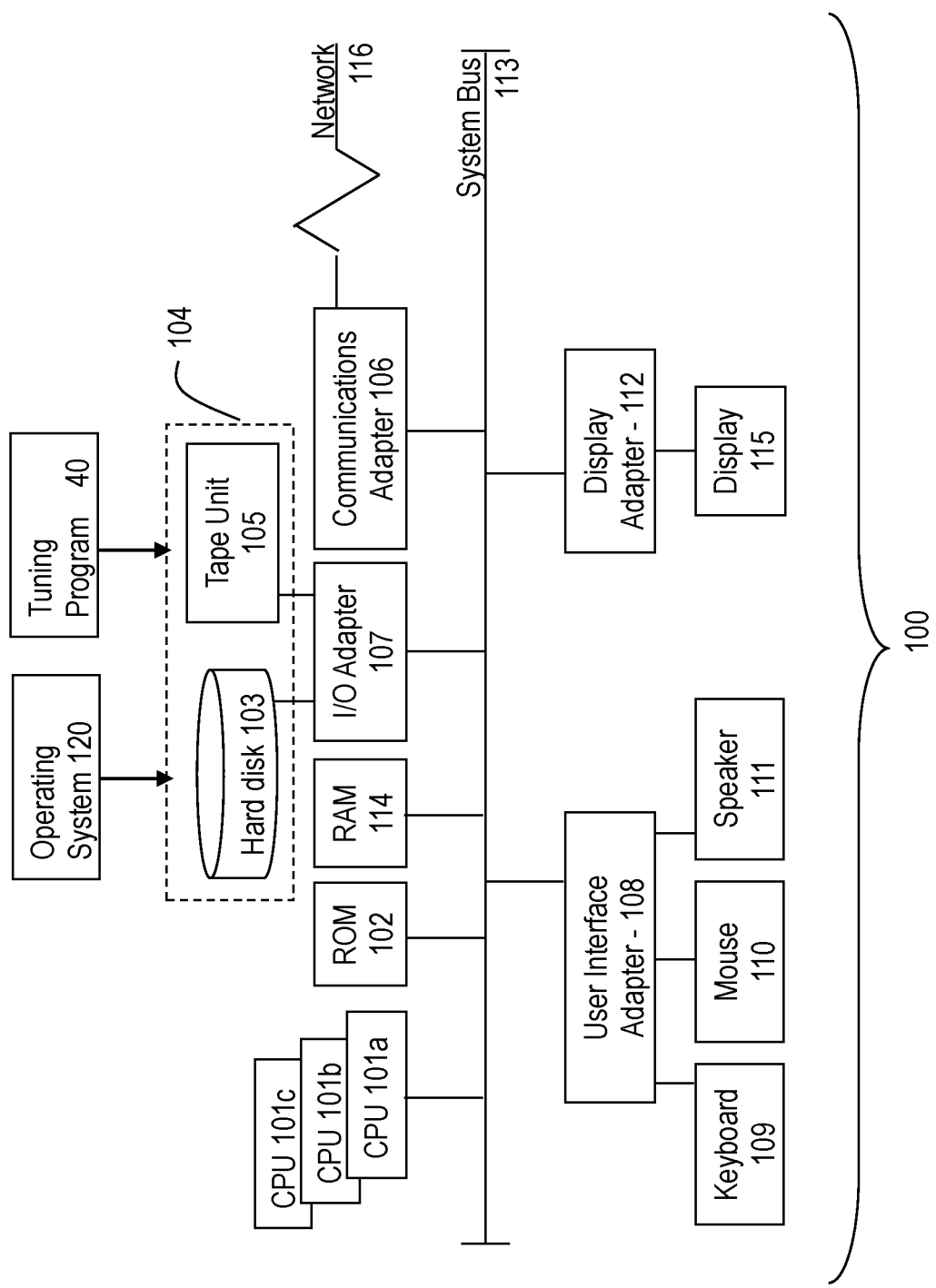
FIG. 3 is a block diagram illustrating one example of a processing system for practice of the teachings according to examples described herein.

Referring to FIG. 3, there is shown an example of a processing system 100 for a given computing device 14 (clients) as may be employed for implementing the teachings herein. In this example, the processing system 100 has at least one central processing unit (e.g., processors) 101a, 101b, 101c, etc. (collectively or generically referred to as processor(s) 101). In one example, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of the processing system 100.

FIG. 3 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage drive 105 are collectively referred to herein as mass storage 104. Operating system 120 for execution on the processing system 100 may be stored in mass storage 104. Likewise the tuning program 40 may also be executed on the processing system 100 and stored in mass storage 104. A network adapter 106 interconnects bus 113 with an outside network 116 enabling processing system 100 to communicate with other such systems. A screen (e.g., a display monitor) 115 is connected to system bus 113 by display adaptor 112, which may include a graphics adapter to improve the performance of graphics intensive applications and a video controller. In one example, adapters 107, 106, and 112 may be connected to at least one I/O buss(es) that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

Thus, as configured in FIG. 3, the processing system 100 includes processing capability in the form of processors 101, storage capability including system memory 114 and mass storage 104, input means such as keyboard 109 and mouse 110, and output capability including speaker 111 and display 115. In one example, a portion of system memory 114 and mass storage 104 collectively store an operating system to coordinate the functions of the various components shown in FIG. 3. It should be appreciate that the components of the system as described are for illustration purposes. Features and functions as described may be omitted, integrated, or distributed as desired to suit a particular application.

Figure 4:
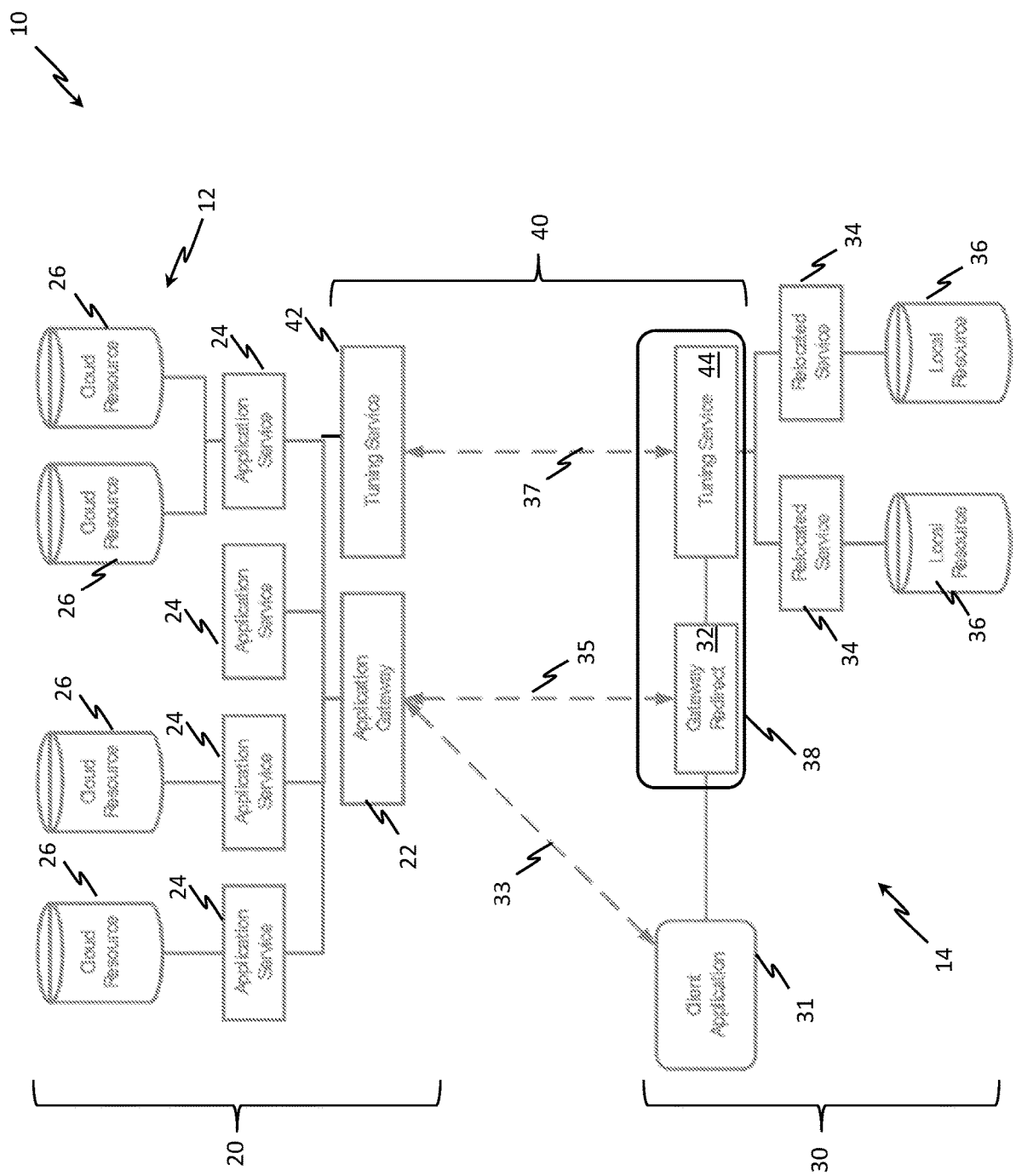
FIG. 4 illustrates a block diagram of a cloud-based computing system with tuning services according to examples described herein.

FIG. 4 illustrates a more detailed diagram of a cloud computing environment 10 according to examples described herein, to enable an enterprise to seamlessly access the cloud-based applications. More specifically, a mechanism is described for cloud application services 24 to provide a single application architecture that can be migrated across data center plans and the like (either to other devices closer to the client endpoint or ultimately to the endpoint device itself (e.g., any of 14a-e) to facilitate resource allocation. This single application architecture both scales elastically within the architecture of cloud computing environment 10, but can now also ensure functionality closer to the endpoint connection for services or functions that may be more performant or more efficient in such a model. Moreover, the described examples do not require specialized code for offloading data and data interactions between cloud computing nodes 12 or even on-premises or client-based local resources (e.g., 36) that is common in other forms of browser-based applications. Furthermore, the described examples are configured to work with client applications programs e.g., client application(s) 31 such as may be operating on a user device e.g., 14 or within or external to the web browser itself and without the knowledge or impacting the client application 31 or user. If the application is architected as an as-a-Service (i.e., networked) application, described methodology for service functionality migration is still effective.

In FIG. 4, details of the interconnection and communication between cloud-based components (as depicted in FIG. 2) and on-premises, client-based components are depicted. In an example, the system and method employed includes a cloud-based portion or functions shown generally as 20 and on-premise or client-based portion shown generally as 30. The cloud-based portion 20 includes, but is not limited to, an application gateway 22 and application services 24, each servicing a cloud-based resource 26 including processing, applications, storage, and the like. The on-premise or client portion 30 includes a client application program 31, hereinafter referred to as client application 31, communications gateway denoted as a gateway redirect function 32, local and relocated application services 34, in operable communication with local, client-based resources 36.

The cloud computing environment 10 also includes a tuning service shown generally as 40 and more specifically having a cloud-based portion referenced as 42 and an on-premise, client-based portion referenced as 44. The tuning service 40 facilitates redirection of workloads as requested of the cloud-based application service 24 to on-premise, client-based, relocated application services 34 and client-based resources 36 as described herein. The tuning service 40 can be used in an automatic mode or a dynamic mode. Automatic meaning that some workloads may be migrated to the client-based on a directive (e.g. from a user or client application 31). Dynamic mode means that workloads are migrated based on some measured property, such as Quality of Service, Network Latency, Size/Scope of workload request, etc. as described herein.

The on-premises, client-based portion 30 provides an enterprise the ability to register a unique name, capabilities, and network address with the above-mentioned cloud application, ability to validate the credential information provided by the cloud application. The on-premises, client-based portion 30 of the cloud computing environment 10 includes an on-premises computing devices shown generally as 14, (e.g., 14a-e as in FIG. 1) including, but not limited to a processing system 100 or a portion thereof (as described with reference to FIG. 3). Each computing device 14, (on premises) can be a control device, mobile device, server, or cloud gateway or the like. As described with respect to FIG. 1, the on-premises, client-based portion 30 may also include sensors 16 (FIG. 1) and other computing devices 14 that communicate with one another as described herein. On-premises clients of the client-based portion 30 may employ the on-premises computing devices 14 to execute client application(s) 31 as desired.

The described examples take advantage of and utilize the compartmentalization of modern cloud-based applications. Typical legacy client-server architectures typically employ monolithic designs to encompass all or a large population of application services and business logic. However, cloud-based application offerings often use network compartmentalization to isolate and scale services that comprise a cloud application individually. As described herein, there are inherent benefits to cloud-based models including horizontal scalability, application composition, compartmentalized control and failure points, among others.

As cloud application architectural models have matured, a common construct has arisen for compartmentalization in the form of containers. Containers provide an isolation point for cloud services, allowing developers to mix and match coding paradigms freely, decoupling service releases, and providing efficiencies in the deployment, servicing and testing of cloud services. Service modules are connected through the network and API (Application Programming Interface) contracts from a client application 31 to the cloud-based portion 20. A component of the architecture acts as a router or application gateway 22 for various services depicted as application service(s) 24 within the cloud-based portion 20.

The application gateway 22 is a well-defined entry-point for the cloud-based application as hosted on the web. The application gateway 22 serves as the ingest point for requests from client application program denoted as 31 operating on a client system as will be discussed further herein. The application gateway 22 routes the requests to the correct IP (Internet Protocol) address and application service 24 offering in the cloud-based portion of the cloud computing environment 10. The described examples take advantage of the use of containers to decouple location even further by allowing a client service and cloud service to synchronize and deploy cloud-hosted containers or a portion thereof of business logic or application services 24 directly to an endpoint client device e.g. client-based portion 30 or an intermediary device known to both the client application 31 and the cloud-based portion 20. This transition is managed and maintained by the tuning service 40 in the described examples and is maintained on a one-to-one basis per client application 31.

Finally, within the client application space, network requests are first checked against a local gateway proxy denoted as a gateway redirect function 32 to determine if the service is available within the tunable cache of services locally, or if the request should be sent to the cloud provider gateway. This model allows for no discernable changes to the client architecture while permitting enhancements in efficiency, scalability, and cost benefit based on reduced cloud interactions. In the described examples, the client application 31 is unaware of migration of workload among cloud-based resources 26 and application services 24 and/or between cloud-based application service 24 and the client application 31. Also, note that this model could also be used to redirect services across cloud provider domains or to device endpoints that are mid-stream from the endpoint and the cloud service.

A tuning program denoted 38, is a set of executable code that enables and provides a modified connectivity with the application gateway 22 and the client-side connectivity to a with the cloud-based tuning service 42. The tuning program 38 includes the gateway redirect function 32 and a client-based tuning service 44, i.e., a client-based portion of the tuning service 40. The tuning program 38 can be delivered as either firmware or software that interfaces the networking stack between the client application 31 and the application gateway 22. The tuning program 38 manages interception of application requests and responses between the client application 31 and the cloud computing environment 10 and provides alternate responses based on the location of resources either on the client portion 30 or within the cloud-based portion 20 of the cloud computing environment 10. In addition, the tuning program 38 is responsible for the management of relocated application services 34 and their resources 36.

Figure 5:
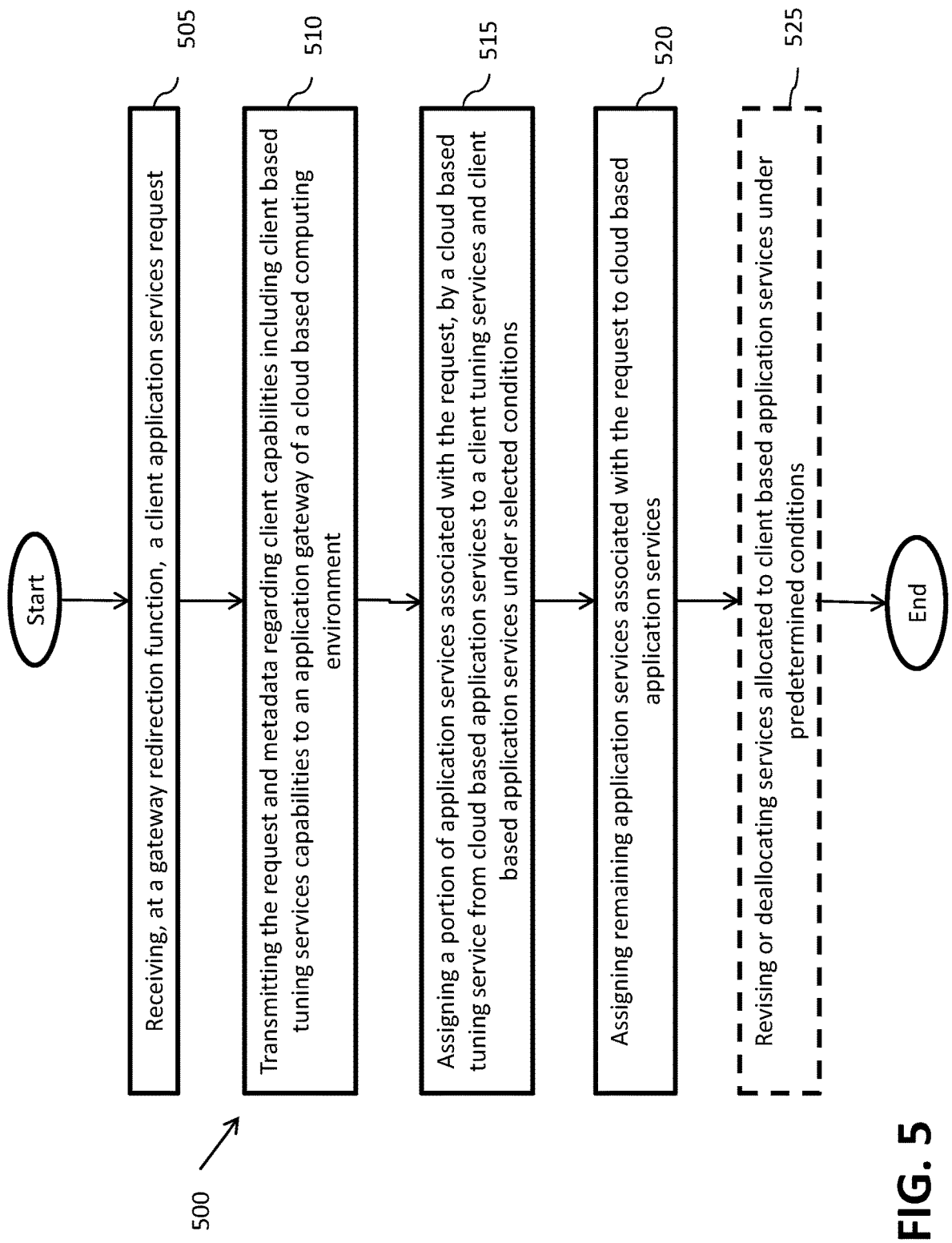
FIG. 5 illustrates a flowchart of a method for tuning cloud application and connected clients according to examples described herein.

Continuing with FIG. 4 and referring also to FIG. 5, various scenarios arise under which the described examples can be employed and applied by methodology 500 to tune resource requests in the cloud computing environment 10. For example, in an example, an application profile or metadata associated with the cloud-based application services 24 specifies which containers should/could be offloaded to the client e.g., and to provide a better application experience to the user/customer and mitigate application costs, improve quality of service, reduce network roundtrips, and the like. Normally during an initialization (as the cloud-based application services are started), the cloud-based tuning service 42 would understand the inventory of container services in the cloud-based application services 24 that can potentially be offloaded to a client (e.g., 31). Moreover, at a later point, during user interactions with the application services 24, the cloud-based tuning service 42 may reevaluate/determine which, and when, the containers should be offloaded to the client system.

In operation, a client application 31 requests a connection, services, or a workload change to a cloud hosted application, e.g., cloud-based application services 24. Typically, the request would be routed through the application gateway 22 as shown by line 33, as the standard communication path for the client application 31 to the Application Programming Interface (API) surface (i.e., exposed endpoint outside the cloud computing environment 10) of the cloud-hosted applications. This is the publicly known access point for the cloud-based application services 24. It should be understood, that any number of application services 24 may be exposed directly, the API or application gateway 22 just provides a simpler view of the model for the cloud computing environment 10. Likewise, many cloud computing environment architectures use this model to hide and secure their application services from unintended or harmful access. Generally, in all client to cloud-based operations, this channel is used to initiate communication. In addition, as described herein, it can also be used as a channel for sending and receiving data or information that are out-of-scope for the cloud-based tuning service 42 (such as downloading images and icons for the screen layout or login and authentication to the cloud-based application services 24, and the like).

Continuing with FIGS. 4 and 5 in the described examples, however, the request from the client application 31 is presented to the gateway redirect function 32 of the tuning program 38 operating as a proxy for the application gateway 22 and/or the application service 24 as depicted at process block 505. Basically, that is, the gateway redirect function 32 of the tuning program 38 has visibility to the full API surface area that the cloud-based application service 24 is providing whether that is on application gateway 22 or directly to the application services 24 underneath. At process block 510, the gateway redirect function 32 of the tuning program 38 forwards the request to the application gateway 22 via line 35. In addition, metadata about the client capabilities, including availability and capabilities of the client-based tuning service 44 is transmitted to the cloud-based tuning service 42 via line 37. This communication of the gateway redirect function 32 and client-based tuning service 44 of the tuning program 38 is the modified communication pattern between the client application 31 and the cloud-based portion 20 when the API surface spans the cloud-based portion 20 and the client-based portion 30 of the cloud computing environment 10. In addition, the gateway redirect function 32 provides capability for local workloads to communicate with other workloads either residing on the client system or in the cloud-based portion 20 of the cloud computing environment 10.

In addition, in an example, at process block 515, the cloud-based tuning service 42 is also provided the client request and negotiates with and assigns, at least a portion of the cloud-based application services 24 from the cloud computing environment 10 to the client-based tuning service 44 also as depicted by line 37. This line represents the command and control protocol between the cloud-based tuning service 42 and the client-based tuning service 44 and is used to negotiate the process of migrating workloads from the cloud-based portion 20 to the client-based portion 30 or providing additional resources for those workloads. Part of the command and control in the tuning service 40 includes understanding client system capabilities (e.g., how much storage, processing power, access to peripheral devices are available in/on local, client-based resources 36 and the like).

Once an application service 24 has been relocated to the client system as described herein, the application surface area is changed because the application service 24 from the cloud-based portion 20 is at a new endpoint location, e.g., allocated to or assigned to the client system. The assignment is based on the information provided with the request and that state of the cloud-based application services 24. It should be appreciated that effectively, in operation, the gateway redirect function 32 masks this change (e.g., the redirection and reallocation) from the client application 31 and redirects client requests for application services 24 to the original application gateway 22 or directly to the application service 24 to the new, relocated application services 34 as described herein. The tuning service 40 also initiates and monitors transfer of data, launching, executing, and shutdown client workloads, and synchronizing resources data changes between cloud-based application service 24 and services that are identified to be allocated to the client portion 30 and the client to be executed. These services redirected by the cloud-based tuning service 42 are denoted as relocated application services 34 operating on local, client-based resources 36.

As relocated application services 34 initialize on the client, the gateway redirect function 32 instructs API requests (from the client application 31) that would normally flow to the cloud-based application services 24, to the client-based, relocated application services 34. Other services, which have not been relocated (per the tuning service 40), are still accessed in the established manner through the application gateway 22. The application gateway 22 coordinates as needed with the cloud-based tuning service 42 with various, remaining, application services 24 and the cloud-based resources 26 to address the request as depicted at process block 520. The client application 31 continues execution with the relocated application services 34 until the user ends their client session and the client-based tuning service 44 and the relocated application services 34 are deallocated or the client request is modified and the tuning service 40 revises the reallocation of services as depicted at process block 525.

In another example, continuing to refer to FIG. 5, the tuning and allocation/reallocation of services is implemented as a function of application quality of service. In this example, the tuning service 40, and in particular, the cloud-based tuning service 42, monitors the quality of the application services 24 as provided in the cloud computing environment 10 to determine if it would be more advantageous to execute certain workloads from the client application 31 at the client-based portion 30 instead of within the cloud-based portion 20 of the cloud computing environment 10. To implement such a scheme, the client application 31 requests a connection to a cloud-based application service 24 as described previously and depicted at process block 505. Once again, as depicted at process block 510 the gateway redirect function 32 forwards the request to the application gateway 22 via line 35 as described previously herein. In addition, any metadata about the client computing capabilities, including availability of client-based resources 36 or the client-based tuning service 44 is transmitted to the cloud-based tuning service 42 as depicted via line 37.

In an example once again, application workload requests sent from the client application 31 via the gateway redirect function 32 are processed by the application gateway 22, and cloud-based tuning service 42 and the applicable cloud-based services and resources 26 are allocated accordingly as described previously, to address the workload and satisfy the request. In addition, the cloud-based tuning service 42 may monitor the quality of the performance of application service(s) 24 and cloud-based resource 26 usage data to determine if any application services 24 currently allocated and implemented in the cloud-based portion 20 should be reallocated and relocated to the client-based portion 30 as depicted again at process block 515. The tuning service 40 may employ various thresholds, rules, or other metadata to make a determination regarding the status of the application services 24, quality of services, and any potential reallocation/relocation. The cloud-based tuning service 42 negotiates the transmittal of application services 24 from the cloud hosting provider's infrastructure to the client-based tuning service 44 as depicted by line 37 and described previously herein.

As relocated application services 34 initialize on the client, the gateway redirect function 32 instructs client API requests that would normally flow to the cloud-based application gateway 22 to the relocated application services 34. As addressed previously, other services that have not been relocated (per the tuning service 40) are still accessed through the application gateway 22 as depicted at process block 520. Furthermore, the client-based tuning service 44 also monitors application communication and resource requirements and based on thresholds, rules, or other metadata can negotiate the transfer of control from relocated application services 34 at the client, back to the cloud-based application services 24, for example to ensure or provide desirable quality of services. The client application 31 continues execution with the relocated application services 34 until the user ends their client session or the tuning service 40 reallocates applications services from the relocated application services 34 and as a result any remaining client resources that were reallocated based on the tuning service 40 are deallocated as depicted at process block 525.

In yet another example of an example, the tuning and allocation/reallocation of cloud-based services (e.g., 24) is implemented as a function of connectivity between the cloud computing environment 10 and the client application 31, or user's election to operate at the client application 31 disconnected from the cloud-based portion 20 of the cloud computing environment 10. For example, in instances where access and or connection to internet resources may be intermittent or not possible for an extended period of time. For example, in a remote location, or during air travel, off shore travel, and the like. In this example, once again, a client application 31 requests a connection to a cloud-based application service 24 and cloud-based resources 26 through the application gateway 22 via line 33. The gateway redirect function 32 once again forwards the request to the application gateway 22 via line 35. In addition, metadata about the client capabilities, including availability of the client-based tuning service 44 is transmitted to the cloud-based tuning service 42 as described herein previously.

In this example, application service requests from the client application 31 are processed by the application gateway 22 as depicted via line 35. In addition, the cloud-based tuning service 42 is also provided the client request and negotiates and assigns, the applicable, cloud-based application services 24 from the cloud computing environment 10 to the client-based tuning service 44 as depicted by line 37. Once again, the assignment is based on the information provided with the request and the indication that the user indicates a desire to operate disconnected/locally. These services are redirected and once again denoted as relocated application services 34 operating on client-based, local, relocated application services 34. The relocated application services 34 initialize on the client, the gateway redirect function 32 instructs API requests that would normally flow to the cloud-based application gateway 22 to the relocated application service 34. Other services that have not been relocated are still accessed through the application gateway 22. It should be appreciated that in the described examples, there will likely always be some cloud-based components that are accessed by the client application 31 directly via the application gateway 22.

As described earlier, in some instances the connection between the client application 31 and the application gateway 22 as depicted by line 33 may still be used as a channel for sending and receiving data or information that are out-of-scope for the cloud-based tuning service 42 (such as downloading images and icons for the screen layout or login and authentication to the cloud-based application services 24, and the like). However, to facilitate the described example in this instance, depending on the sophistication of the application service 24, it may also be possible for the gateway redirect function 32 to simulate connectivity for an application service 24 that is disconnected. That is, it is possible for the tuning program 38 to mimic or provide simplistic representations of behaviors of a connected application as a mechanism to provide stability of services within the client application 31 instead of a system "crash" or indefinite wait for a response. As a result, enabling the application to continue to "work" locally with a relocated application service 34 until such time as the client application 31 is reconnected to the network and the cloud-based portion 20.

If in the example of a disconnected network, the network becomes available again, the client application 31 can request that execution be discontinued. In an example the client-based tuning service 44 can automate this request by monitoring network connectivity and can negotiate the transfer of control from local client-based relocated application services 34 back to cloud-based application services 24. The client application 31 continues execution with the relocated application services 34 until the user ends their client session and the client-based tuning service 44 and the relocated services 34 are deallocated/un-assigned or the client request is modified and the tuning service 40 revises the assignment/reallocation of services.

In this manner by way of operation of the various embodiments, the method and system for tuning cloud-based services between a cloud-based portion 20 and a client based portion—of a cloud computing environment 10. Such tuning facilitates improving overall efficiency and cost associated with cloud computing access but selectively tailoring and reallocating services to the client system to improve overall efficiency and save costs.

The terminology used herein is for the purpose of describing particular examples and is not intended to be limiting. As used herein, the singular forms "a", "an" and "the" are intended to include the plural forms as well, unless the context clearly indicates otherwise. The terms "a", "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection".

The terms "comprises" and/or "comprising," "includes," "including," "has," "having," "contains" or "containing," or any other variation thereof, when used in this specification, specify the presence of stated features, integers, steps, operations, elements, and/or components, but do not preclude the presence or addition of one or more other features, integers, steps, operations, elements, components, and/or groups thereof. References in the specification to "one embodiment," "an embodiment," "an example embodiment", "example" etc., indicate that the embodiment described can, but need not include a particular feature, structure, or characteristic. Moreover, such phrases are not necessarily referring to the same example. Further, when a particular feature, structure, or characteristic is described in connection with an example, it is submitted that such feature, structure, or characteristic may be employed in connection with other examples whether or not explicitly described.

The present examples may be a system, a method, and/or a computer program product at any possible technical detail level of integration. The computer program product may include a computer readable storage medium (or media) having software, firmware that are computer readable program instructions thereon for causing a processor to carry out aspects of the present disclosure. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of programming languages, including an object oriented programming language such as Java, Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some examples, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

While the present disclosure has been described in detail in connection with a limited number of examples, it should be readily understood that the present disclosure is not limited to such disclosed examples. Rather, the present disclosure can be modified to incorporate any number of variations, alterations, substitutions, combinations, sub-combinations, or equivalent arrangements not heretofore described, but which are commensurate with the scope of the present disclosure. Additionally, while various examples of the present disclosure have been described, it is to be understood that aspects of the present disclosure may include some of the described examples.

What is claimed is:

1. A cloud computing system for tuning and relocating application services, the cloud computing system comprising:
   a cloud-based server system in operable communication with a client system, the cloud-based server system including a computer processor and a memory containing a program, which when executed by the processor, performs an operation comprising:
      an application gateway receives from a client application in the client system, a request for services associated with a workload;
      a plurality of cloud-based application services operable on a plurality of cloud-based resources, wherein the plurality of cloud-based application services in operable communication with the application gateway;
      a tuning program in operable communication with the client system and the cloud-based server system and intercepts the request and provide alternate responses based on a location of the resources; and
      a cloud-based tuning service in operable communication with the plurality of cloud-based application services and the application gateway, wherein the cloud-based tuning service identifies a set of application requirements sufficient to fulfill the request, wherein the cloud-based tuning service coordinating with a client-based tuning service and the application gateway to assign selected application services of the plurality of cloud-based application services to fulfill the request, wherein the assignment of selected application services includes assigning at least a portion of the services associated with the workload to an application service that has been relocated to the client system, and wherein the client system includes a client-based tuning service that monitors communications and resource requirements and based on related thresholds or rules, negotiates a transfer of control of the relocated application service at the client system back to the cloud-based server system.

2. The cloud computing system of claim 1, wherein the assignment includes allocating select application services of the plurality of cloud-based application services to the client-based tuning service and the client system.

3. The cloud computing system of claim 2, wherein the information includes at least one of an application profile, metadata of the client system, metadata regarding the client application, capabilities of at least one of the client-based tuning service and the client system, capabilities of at least one of the client-based tuning service and the client system, connectivity between the client system and the cloud-based server system, a connection selection by a user.

4. The cloud computing system of claim 1, wherein the assignment is based on information in the request.

5. The cloud computing system of claim 1, wherein the assignment is based on quality of service associated with at least one cloud-based application service of the plurality of cloud-based application services including a determination of when the quality of service is increased by utilizing the application service that has been relocated to the client system.

6. The cloud computing system of claim 1, wherein the assignment is based on connectivity of the client system to the cloud-based server system including utilizing the application service that has been relocated to the client system to compensate for lack of adequate connectivity of the client system to the cloud-based server system.

7. The cloud computing system of claim 1, wherein the client application is independent of the assignment.

8. The cloud computing system of claim 1, wherein at least one of:
   the cloud-based tuning service coordinates with the client-based tuning service and the application gateway to un-assign the selected application services of the plurality of cloud-based application services; and
   the cloud-based tuning service coordinates with the client-based tuning service and the application gateway to modify the assignment of the selected application services of the plurality of cloud-based application services wherein the assignment of selected application services includes assigning at least another portion of the services associated with the workload the client system.

9. The cloud computing system of claim 1, wherein the tuning service is to, during an initialization, determine a number of containers among the cloud-based application services to offload to the client system.

10. A system for tuning and relocating on a cloud computing system connected to a client system, the system comprising:
    a client system in operable communication with a cloud-based server system, the client system including a computer processor and a memory containing a program, which when executed by the processor, performs an operation comprising:
       transmitting, a request for application services to be allocated to a workload to a cloud computing environment;
       identifying, by a tuning service, a set of requirements to fulfill the request;
       determining, by the tuning service, a set of application services suitable to satisfy the set of requirements; and
       providing, by the tuning service, the set of application services suitable to fulfill the request, wherein the providing includes assigning at least a portion of the set of application services to the client system, wherein the client system includes a client-based tuning service that monitors communications and resource requirements and based on related thresholds or rules, negotiates a transfer of control of reassignment of the set of application services at the client system back to the cloud-based server system and wherein a tuning program intercepts the request and provide alternate responses based on a location of the resources.

11. The system of claim 10, wherein the tuning service comprises a gateway redirect function in the client system, the gateway redirect function to determine when a service that is part of filling the request is available within a tunable cache of services locally on the client system, in which case the tuning service to use the gateway redirection function for assigning at least a portion of the set of application services to the tunable cache of services of the client system.

12. The system of claim 11, wherein the gateway redirect function has visibility to a full Applicant Programming Interface (API) surface area of a cloud-based application service of the cloud-based server system.

13. The system of claim 11, wherein the tuning service is to transmit meta data about capabilities of the client system to the cloud-based server system such that communication from the gateway redirect function and the tuning service is a communication pattern between a client application of the client system and an Application Programming Interface (API) of a cloud-based application of the cloud-based server system.

14. A method of tuning and relocating cloud applications of a cloud-based server system in operable communication with a client system, the method comprising:
   transmitting a request for resources to be allocated to a workload for a client application associated with the client system to an application gateway of the cloud-based server system;
   assigning, by a cloud-based tuning service to a client-based tuning service, a portion of a set of application services sufficient to satisfy the request to the client system, wherein the client-based tuning service monitors communications and resource requirements and based on related thresholds or rules, negotiates a transfer of control of reassignment of the set of application services at the client system back to the cloud-based server system and wherein a tuning program intercepts the request and provide alternate responses based on a location of the resources; and
   allocating, by the cloud-based tuning service, any remaining application services of the set of application services sufficient to satisfy the request to the cloud-based server system.

15. The method of tuning cloud applications and a connected client system of claim 14, wherein the assigning is based on information in the request.

16. The method of tuning cloud applications and a connected client system of claim 15, wherein the information includes at least one of an application profile, metadata of the client system, metadata of the client application, capabilities of at least one of the client-based tuning service and client system, capabilities of at least one of the client-based tuning service and client system, connectivity between the client system and the cloud-based server system, a connection selection by a user.

17. The method of tuning cloud applications and a connected client system of claim 14, wherein the assigning is based on at least one of a quality of service associated with at least one application service of the set of application services and a connectivity of the client system to the cloud-based server system.

18. The method of tuning cloud applications and a connected client system of claim 14, wherein the client application is independent of the assigning.

19. The method of tuning cloud applications and a connected client system of claim 14, further including at least one of:
   un-assigning at least part of the portion of the set of application services assigned to the client system; and
   modifying the assignment of the portion of the set of application services assigned to the client system.

20. The method of tuning cloud applications and a connected client system of claim 14, wherein the cloud-based server system comprises a number of cloud-based application services and the method further comprising, during an initialization, determining a number of containers among the cloud-based application services to offload to the client system.

* * * * *